(12) United States Patent
Kawai et al.

(10) Patent No.: US 12,552,963 B2
(45) Date of Patent: Feb. 17, 2026

(54) METHOD FOR PRODUCING LAMINATED FILM

(71) Applicant: TORAY Industries, Inc., Tokyo (JP)

(72) Inventors: Yurika Kawai, Otsu (JP); Takejiro Inoue, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 285 days.

(21) Appl. No.: 18/283,297

(22) PCT Filed: Mar. 25, 2022

(86) PCT No.: PCT/JP2022/014330
§ 371 (c)(1),
(2) Date: Sep. 21, 2023

(87) PCT Pub. No.: WO2022/210340
PCT Pub. Date: Oct. 6, 2022

(65) Prior Publication Data
US 2024/0166916 A1 May 23, 2024

(30) Foreign Application Priority Data
Mar. 29, 2021 (JP) .................................. 2021-054814

(51) Int. Cl.
*B32B 7/12* (2006.01)
*B32B 27/08* (2006.01)
(Continued)

(52) U.S. Cl.
CPC .................. *C09J 4/00* (2013.01); *B32B 7/12* (2013.01); *B32B 27/08* (2013.01); *B32B 27/32* (2013.01);
(Continued)

(58) Field of Classification Search
CPC ........ B32B 2333/12; B32B 2310/0887; B32B 2309/12; B32B 2309/02; B32B 2307/748;
(Continued)

(56) References Cited

U.S. PATENT DOCUMENTS

2010/0234523 A1 9/2010 Uozumi et al.
2020/0010701 A1 1/2020 Tsuji et al.

FOREIGN PATENT DOCUMENTS

CN 110337472 A 10/2019
CN 112313304 A * 2/2021 .............. C09J 11/06
(Continued)

OTHER PUBLICATIONS

Machine translation of JP 2015136918 A (Year: 2015).*
(Continued)

*Primary Examiner* — Vishal I Patel
(74) *Attorney, Agent, or Firm* — Birch, Stewart, Kolasch & Birch, LLP

(57) ABSTRACT

An object of the present invention is to provide a method for producing a laminated film, the method capable of producing a laminated film excellent in curability of an ink and adhesion between the ink and a second substrate with high productivity.
The present invention is a method for producing a laminated film, the method including: a printing step of applying an active energy ray-curable printing ink to a first substrate film formed of at least a plastic film; an adhesive application step of applying an adhesive; and a lamination step of laminating a second substrate, the steps being performed in this order in-line, the method further including a curing step of irradiating the active energy ray-curable printing ink with an active energy ray to cure the active energy ray-curable printing ink after at least the adhesive application step.

21 Claims, 1 Drawing Sheet

(51) Int. Cl.
  *B32B 27/32* (2006.01)
  *B32B 27/36* (2006.01)
  *B32B 37/12* (2006.01)
  *B32B 37/24* (2006.01)
  *C09D 11/101* (2014.01)
  *C09J 4/00* (2006.01)
  *C09J 175/04* (2006.01)

(52) U.S. Cl.
  CPC .............. *B32B 27/36* (2013.01); *B32B 37/12* (2013.01); *B32B 37/24* (2013.01); *C09D 11/101* (2013.01); *C09J 175/04* (2013.01); *B32B 2037/243* (2013.01); *B32B 2255/10* (2013.01); *B32B 2255/26* (2013.01); *B32B 2255/28* (2013.01); *B32B 2307/4023* (2013.01); *B32B 2307/748* (2013.01); *B32B 2309/02* (2013.01); *B32B 2309/12* (2013.01); *B32B 2310/0887* (2013.01); *B32B 2333/12* (2013.01)

(58) Field of Classification Search
  CPC ........ B32B 2307/4023; B32B 2255/28; B32B 2255/26; B32B 2255/10; B32B 2037/243; B32B 37/24; B32B 37/12; B32B 27/36; B32B 27/32; B32B 27/08; B32B 7/12; C09J 175/04; C09J 4/00; C09D 11/101
  See application file for complete search history.

(56) References Cited

FOREIGN PATENT DOCUMENTS

| | | | |
|---|---|---|---|
| JP | 2010-209274 A | 9/2010 | |
| JP | 2011-26551 A | 2/2011 | |
| JP | 2011-162770 A | 8/2011 | |
| JP | 2015136918 A | * 7/2015 | |
| JP | 6431673 B2 | 11/2018 | |
| WO | WO-2009048585 A1 | * 4/2009 | ........... C09D 11/101 |
| WO | WO2018/117079 A1 | 6/2018 | |
| WO | WO 2022/064461 A1 | 3/2022 | |

OTHER PUBLICATIONS

International Search Report (PCT/ISA/210), issued in PCT/JP2022/014330, dated Jun. 21, 2022.
Written Opinion of the International Searching Authority (PCT/ISA/237), issued in PCT/JP2022/014330, dated Jun. 21, 2022.
Chinese Office Action and Search Report for Chinese Application No. 202280024647.0, dated May 17, 2025, with English translation.
Extended European Search Report for European Application No. 22780553.8, dated Feb. 20, 2025.

* cited by examiner

METHOD FOR PRODUCING LAMINATED FILM

TECHNICAL FIELD

The present invention relates to a method for producing a laminated film, the method including: a printing step of applying an active energy ray-curable printing ink to a first substrate film formed of at least a plastic film; an adhesive application step of applying an adhesive; and a lamination step of laminating a second substrate, the steps being performed in this order in-line.

BACKGROUND ART

Lithographic printing (offset printing) is a printing system widely used as a system capable of inexpensively supplying a large volume of printed material at high speed. Conventionally, the lithographic system has been mainly applied to printing on paper, but in recent years, application to soft packaging printing for printing on a thin plastic film has been studied mainly for packaging applications such as daily goods, foodstuffs, and pharmaceuticals.

In recent years, active energy ray-curable lithographic inks that are instantaneously cured by irradiation with an active energy ray such as a mercury lamp, a metal halide lamp, a light emitting diode, or an electron beam are widely known in many fields from the viewpoints of equipment, safety, environment, and productivity. Such an active energy ray-curable lithographic ink is considered to be a material suitable for printing on a plastic film having poor heat resistance because it can be cured at room temperature in a short time. However, along with an increase in the printing speed and reduction in the exposure amount due to power saving, curing of the ink is insufficient in some cases. In view of the above problem, as a lithographic ink having both highly sensitive active energy ray curability and water washability and excellent scumming resistance during printing and water resistance of a cured film, there has been proposed a lithographic ink containing (a) a pigment and (b) a resin having an ethylenically unsaturated group and a hydrophilic group (see, for example, Patent Document 1). In the above-described packaging applications and the like, another plastic film, a metal foil, a hot-melt film (sealant) or the like is generally bonded to the obtained printed material from the viewpoint of protecting contents, improving impact resistance, imparting heat sealability and the like.

Meanwhile, as a method for producing a packaging material using a thin plastic film as a substrate, there have been proposed a method including printing a pattern on a substrate, curing an ink by energy ray irradiation, and laminating a heat seal layer on the substrate with an adhesive interposed therebetween (see, for example, Patent Document 2), a method including a step of applying an ink composition to a transparent substrate 1, and drying and curing the ink composition to obtain an ink layer, a step of applying a specific adhesive composition onto the ink layer to form a precursor of an adhesive layer, a step of stacking a substrate 2 onto the precursor of the adhesive layer, and a step of curing the precursor of the adhesive layer to form the adhesive layer (see, for example, Patent Document 3), and the like.

PRIOR ART DOCUMENT

Patent Documents

Patent Document 1: International Publication No. 2017/047817
Patent Document 2: Japanese Patent Laid-open Publication No. 2005-329983
Patent Document 3: Japanese Patent Laid-open Publication No. 2018-27658

SUMMARY OF THE INVENTION

Problems to be Solved by the Invention

In the production of a laminated film in which another substrate is laminated on a printed material having a plastic film as a substrate, Patent Documents 2 to 3 disclose a method of laminating a second substrate to a cured ink layer by using an isocyanate-curing adhesive in off-line. In such a method, an active energy ray-curable printing ink is preferably used from the viewpoint of reducing an organic solvent, but there is a problem that the curability of the ink and adhesion between the ink and the plastic film is insufficient. Moreover, a long aging process such as processing at 40° C. for 3 days is required for curing the isocyanate-curing adhesive, and there is a problem in productivity.

Therefore, an object of the present invention is to solve the problems of the prior art, and to provide a method for producing a laminated film, in which a laminated film excellent in curability of the ink and adhesion between the ink and the second substrate can be produced with high productivity.

Solutions to the Problems

The present inventors have paid attention to the fact that when the surface of the ink is exposed to oxygen in the process of curing the ink by an active energy ray, the curability of the ink and adhesion between the ink and the plastic film become insufficient, and have arrived at the present invention.

That is, the present invention is a method for producing a laminated film, the method including: a printing step of applying an active energy ray-curable printing ink to a first substrate film formed of at least a plastic film; an adhesive application step of applying an adhesive; and a lamination step of laminating a second substrate, the steps being performed in this order in-line, the method further including a curing step of irradiating the active energy ray-curable printing ink with an active energy ray to cure the active energy ray-curable printing ink after at least the adhesive application step.

Effects of the Invention

According to the method for producing a laminated film of the present invention, a laminated film excellent in curability of the ink and adhesion between the ink and the second substrate can be produced with high productivity.

EMBODIMENTS OF THE INVENTION

Hereinafter, the present invention will be specifically described.

A method for producing a laminated film of the present invention includes a printing step of applying an active energy ray-curable printing ink (hereinafter, may be simply referred to as "ink") to a first substrate film formed of at least a plastic film, an adhesive application step of applying an adhesive, and a lamination step of laminating a second substrate, the steps being performed in this order in-line, the method further including a curing step of irradiating the active energy ray-curable printing ink with an active energy ray after at least the adhesive application step. The laminated film in the present invention has at least a cured product of the ink, a cured product of the adhesive, and the second substrate film on the first substrate film. The cured product of the ink only needs to be provided at a necessary position according to the pattern, and does not need to be provided on the entire surface of the laminated film.

A first aspect of the method for producing a laminated film of the present invention employs an active energy ray-curable adhesive as an adhesive in the adhesive application step, and includes the printing step, adhesive application step, lamination step, and curing step described above in this order. That is, the first aspect of the method for producing a laminated film of the present invention is a method including applying an ink and an adhesive, laminating a second substrate thereon, and then curing the ink and the adhesive by an active energy ray.

A second aspect of the method for producing a laminated film of the present invention employs a non-solvent isocyanate adhesive as an adhesive in the adhesive application step, and includes the printing step, adhesive application step, curing step, and lamination step described above in this order. That is, the second aspect of the method for producing a laminated film of the present invention is a method including applying an adhesive onto an ink, curing the ink by an active energy ray, and then laminating a second substrate thereon. In both aspects, by continuously performing the printing step to the lamination step or the curing step in a series of production processes, that is, in-line, the lead time is reduced, thus making it possible to improve the productivity. In addition, the processing loss generated in the lamination step can be reduced as compared with the off-line production in which the printing step and the lamination step are discontinuously performed. Further, when the ink is cured by an active energy ray, the presence of the adhesive and/or the second substrate on the surface of the ink suppresses insufficient curing of the ink due to exposure of the surface of the ink to oxygen. This makes it possible to improve the adhesion between the second substrate and the ink, and the curability of the ink.

Figure 1:
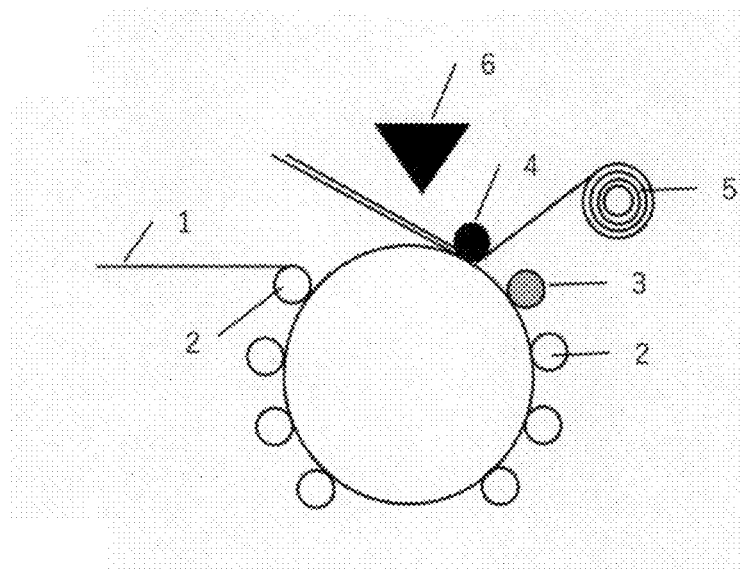
FIG. 1 is a schematic view showing an example of a first aspect of a method for producing a laminated film of the present invention.

FIG. 1 shows a schematic view of an example of the first aspect of the method for producing a laminated film of the present invention. An ink is applied to a first substrate film 1 by an offset printing unit 2 of a center drum lithographic printing press (printing step). Subsequently, on the same cylinder, an active energy ray-curable adhesive is applied by a flexographic printing unit 3 of the center drum lithographic printing press (adhesive application step), and a second substrate 5 is laminated thereon using a nip roll 4 (lamination step). Then, the ink and the active energy ray-curable adhesive are simultaneously cured by irradiation with an active energy ray by an electron beam irradiation device 6 (curing step).

Figure 2:
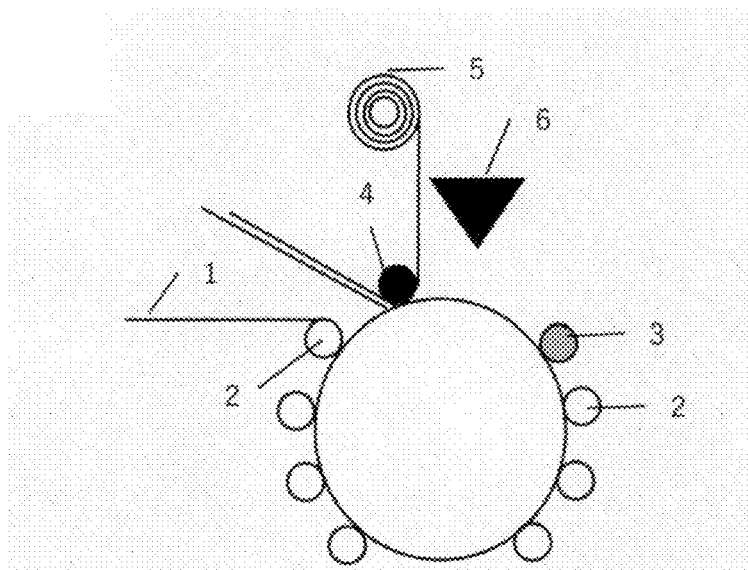
FIG. 2 is a schematic view showing an example of a second aspect of the method for producing a laminated film of the present invention.

FIG. 2 shows a schematic view of an example of the second aspect of the method for producing a laminated film of the present invention. An ink is applied to a first substrate film 1 by an offset printing unit 2 of a center drum lithographic printing press (printing step). Subsequently, on the same cylinder, a non-solvent isocyanate-curing adhesive is applied by a flexographic printing unit 3 of the center drum lithographic printing press (adhesive application step), the ink is irradiated with an active energy ray by an electron beam irradiation device 6 via the non-solvent isocyanate-curing adhesive (curing step) to cure the ink, and then a second substrate 5 is laminated thereon using a nip roll 4 (lamination step).

The first substrate film is formed of a plastic film, and imparts the strength to the laminated film to withstand tension and the like generated in the printing step. Examples of the plastic film include an oriented polyester film, an oriented polyamide film, an oriented polypropylene (OPP) film, a cast polypropylene film (CPP), and a polyethylene film. The plastic film can be appropriately selected among them according to the required properties such as the leveling property of the ink, appearance quality, barrier property for protecting the contents, and the like, and two or more of these may be used. These plastic films may have an easily adhesive layer, an anchor layer, a metal vapor deposition layer, a metal oxide layer, and the like.

The thickness of the first substrate film is preferably 50 μm or less, and more preferably 30 μm or less from the viewpoint of processability and cost.

Examples of the second substrate include an oriented film, a metal film, and a hot-melt film (sealant film). Two or more of these may be used.

By using an oriented film as the second substrate, the strength of the laminated film can be improved, thus making it possible to improve the effect of protecting the contents in packaging applications. Examples of the oriented film include an oriented polyamide film, an oriented polyester film, and an oriented polyolefin film. The oriented film may have a metal vapor deposition layer, a metal oxide layer, and the like. In packaging applications, the oriented film can suppress deterioration of the contents due to transmission of oxygen, water vapor, light, and the like to the inside.

By using a metal film as the second substrate, it is possible to further suppress deterioration of the contents due to transmission of oxygen, water vapor, light, and the like to the inside. In addition, the metal film can suppress infiltration of the contents to the outer layer side thereof and suppress deterioration of the outer layer portion. Examples of the metal film include an aluminum foil.

By using a hot-melt film as the second substrate, a pouch can be formed by thermally melting (heat-sealing) the laminated portion of the first substrate and the second substrate. Examples of the hot-melt film include a cast polypropylene film (CPP), a linear low density polyethylene film (LLDPE), and a low density polyethylene film (LDPE).

In the case of the oriented film, the thickness of the second substrate is preferably 50 μm or less, and more preferably 30 μm or less from the viewpoint of processability and cost. In the case of the metal film, the thickness is preferably 20 μm or less, and more preferably 12 μm or less. In the case of the hot-melt film, the thickness is preferably 20 to 120 μm.

The active energy ray-curable printing ink in the present invention refers to one containing a component having an ethylenically unsaturated double bond. The active energy ray-curable printing ink in the present invention preferably contains a resin and a compound having an ethylenically unsaturated double bond. When the active energy ray-curable printing ink contains the resin, fluidity suitable for the ink can be imparted to the active energy ray-curable printing ink, and scattering (misting) of the ink at the time of printing can be suppressed. Note that even a resin having an ethylenically unsaturated double bond is classified as the resin. Examples of the compound having an ethylenically unsaturated double bond include monomers and oligomers having an ethylenically unsaturated double bond. The molecular weight of the monomer is preferably less than 1,500. The oligomer refers to a polymer having a relatively low molecular weight, and the weight average molecular weight thereof is preferably 1,500 or more and 15,000 or less. The active energy ray-curable printing ink preferably contain a urethane (meth)acrylate as the oligomer having an ethylenically unsaturated double bond. Here, "(meth)acrylate" is a generic term including acrylate and methacrylate. When the active energy ray-curable printing ink contains urethane (meth)acrylate, the cohesive force of the ink can be improved by hydrogen bond interaction derived from a urethane bond. Therefore, it is possible to reduce the difference in viscosity between the ink and the adhesive and to suppress back trapping. Also in the second aspect, inclusion of urethane (meth)acrylate improves the affinity of the active energy ray-curable printing ink with the non-solvent isocyanate-curing adhesive, thus making it possible to further improve the adhesion between the ink and the second substrate. The active energy ray-curable printing ink may further contain another monomer having an ethylenically unsaturated double bond, a pigment, an acylphosphine oxide compound, or the like. Examples of the ink include the printing ink disclosed in International Publication No. 2020/235557.

Examples of the resin contained in the ink include an acrylic resin, a styrene acrylic resin, a styrene maleic acid resin, a rosin-modified maleic acid resin, a rosin-modified acrylic resin, an epoxy resin, a polyester resin, a polyurethane resin, and a phenol resin. Two or more of these may be used. Among them, an acrylic resin, a styrene acrylic resin, and a styrene maleic acid resin are preferably used from the viewpoint of ease of synthesis, compatibility with other components, dispersibility of the pigment, and the like.

The resin contained in the ink preferably has an ethylenically unsaturated double bond and a hydrophilic group. When the resin has an ethylenically unsaturated double bond, a crosslinked structure is formed by a reaction with a radical species in the curing step, so that the sensitivity of the ink to an active energy ray can be improved. In addition, a strong covalent bond is formed by a reaction with the acryloyl group of urethane (meth)acrylate, so that adhesion of the ink to the first substrate film and resistance of the laminated film to hot water treatment or the like can be improved. Further, in the first aspect, a strong covalent bond is formed by a reaction with the acryloyl group contained in the active energy ray-curable adhesive, so that adhesion of the ink to the second substrate can be further improved. On the other hand, when the resin has a hydrophilic group and the active energy ray-curable printing ink contains urethane (meth)acrylate, the cohesive force of the ink is increased by strong interaction with a urethane bond. As a result, the resistance of the laminated film to hot water treatment or the like and the scumming resistance of the ink can be improved, thus making it possible to suppress back trapping. Here, the term "scumming resistance" means that a phenomenon (scumming) in which the ink is deposited on the printing plate and transferred to the first substrate film hardly occurs in a non-image area to which the ink is not intended to be transferred. In addition, the term "back trapping" refers to a phenomenon in which the viscosity of the adhesive becomes larger than that of the ink, and the ink is transferred to the adhesive side.

Examples of the hydrophilic group include a hydroxyl group, an amino group, a mercapto group, a carboxyl group, a sulfo group, and a phosphate group. Two or more of these may be contained. When the active energy ray-curable printing ink contains urethane (meth)acrylate, among these, a carboxyl group and a hydroxyl group which have good interaction with a urethane bond are preferable, and more preferably, the resin has a carboxyl group and a hydroxyl group.

The acid value of the resin having an ethylenically unsaturated group, a carboxyl group, and a hydroxyl group is preferably 75 mgKOH/g or more, and preferably 150 mgKOH/g or less. Here, the acid value of the resin may be measured according to the neutralization titration in Section 3.1 of the test method of JIS K 0070: 1992. The iodine value of the resin having an ethylenically unsaturated group, a carboxyl group, and a hydroxyl group is preferably 1.5 mol/kg or more, and preferably 2.5 mol/kg or less. Here, the iodine value of the resin may be measured according to the method described in Section 6.0 of the test method of JIS K 0070: 1992.

The resin having an ethylenically unsaturated group, a carboxyl group, and a hydroxyl group can be obtained, for example, by copolymerizing a monomer having a carboxyl group, a monomer having a hydroxyl group, and other monomers as necessary, and then adding an ethylenically unsaturated compound having a glycidyl group to the resulting copolymer.

The weight average molecular weight of the resin is preferably 20,000 or more from the viewpoint of improving the resistance of the laminated film to hot water treatment or the like and the scumming resistance of the ink, and increasing the viscosity of the ink to suppress back trapping. On the other hand, the weight average molecular weight of the resin is preferably 50,000 or less from the viewpoint of improving the fluidity of the ink. Here, the weight average molecular weight of the resin refers to a value in terms of polystyrene calculated using gel permeation chromatography (GPC).

The content of the resin in the ink is preferably 5 mass % or more, and more preferably 10.0 mass % or more from the viewpoint of easily adjusting the viscosity α described later to a preferable range described later. On the other hand, the content of the resin in the ink is preferably 40 mass % or less, and more preferably 15 mass % or less from the viewpoint of easily adjusting the viscosity α described later to a preferable range described later.

The urethane (meth)acrylate can be obtained by a reaction of a polyol, an isocyanate, and a (meth)acrylate. More specifically, the urethane (meth)acrylate can be obtained, for example, by a method of adding a polyol to an addition reaction product of an isocyanate and a (meth)acrylate. Examples of the polyol include polyether polyol, polyester polyol, and polycarbonate polyol. The isocyanate is preferably, for example, alicyclic isophorone diisocyanate (IPDI) and hydrogenated xylylene diisocyanate from the viewpoint of heat resistance and safety. In addition, the isocyanate is preferably tolylene diisocyanate (TDI), diphenylmethane diisocyanate (MDI), and xylylene diisocyanate (XDI) from the viewpoint of cost, except for applications in which there is a risk of elution into contents such as food to be heat-sterilized. The (meth)acrylate is preferably 2-hydroxyethyl acrylate.

Since a segment derived from the polyol has high flexibility, the flexibility and shape conformity of the urethane (meth)acrylate are improved as the molecular weight of the polyol is larger, so that adhesion of the ink to the second substrate can be further improved. On the other hand, from the viewpoint of sensitivity to an active energy ray and curability, it is preferable that the molecular weight of the polyol is small and the ratio of the (meth)acrylate is high.

In the present invention, the weight average molecular weight of the urethane (meth)acrylate is preferably 500 or more from the viewpoint of improving the sensitivity to an active energy ray and further improving the curability. On the other hand, the weight average molecular weight of the urethane (meth)acrylate is preferably 10,000 or less from the viewpoint of improving the scumming resistance and the transferability of the ink.

The urethane (meth)acrylate preferably has two or more (meth)acrylates in one molecule, and more preferably two (meth)acrylates from the viewpoint of compatibility with other ink components and easily adjusting the viscosity $\alpha$ described later to a preferable range described later.

The monomer having an ethylenically unsaturated double bond is preferably a (meth)acrylate having a hydroxyl group. Such a (meth)acrylate can improve the resistance of the laminated film to hot water treatment or the like by interaction with the hydrophilic group in the resin. Preferred examples of the (meth)acrylate having a hydroxyl group include pentaerythritol tri(meth)acrylate, diglycerin tri(meth)acrylate, and ditrimethylolpropane tri(meth)acrylate.

The content of the compound having an ethylenically unsaturated double bond in the ink is preferably 50 mass % or more, and more preferably 65 mass % or more from the viewpoint of easily adjusting the viscosity $\alpha$ described later to a preferable range described later. On the other hand, the content of the compound having an ethylenically unsaturated double bond in the ink is preferably 80 mass % or less from the viewpoint of easily adjusting the viscosity $\alpha$ described later to a preferable range described later. In particular, the content of the urethane (meth)acrylate is preferably 1 mass % or more in order to improve adhesion of the ink to the substrate, and is preferably 20 mass % or less from the viewpoint of compatibility with other ink components and easily adjusting the viscosity $\alpha$ described later to a preferable range described later.

Examples of the pigment include an inorganic pigment and an organic pigment. The content of the pigment in the ink is preferably 15 mass % or more, and preferably 40 mass % or less in the case of a pigment having a specific gravity of 2 or less. The content of the pigment is preferably 40 mass % or more, and preferably 50 mass % or less in the case of a pigment having a specific gravity of more than 2.

Since the acylphosphine oxide compound absorbs light in a long wavelength range of 350 nm or more, the acylphosphine oxide compound has high sensitivity even when the ink contains a pigment that absorbs or reflects ultraviolet light. In addition, the acylphosphine oxide compound has a photobleaching effect in which light absorption is lost after the reaction, and thus exhibits excellent internal curability. In particular, the acylphosphine oxide compound can improve the compatibility by being combined with a (meth)acrylate having a hydroxyl group, and improve the sensitivity of the ink to the active energy ray. Preferred examples of the acylphosphine oxide compound include 2,4,6-trimethylbenzoyl-diphenyl-phosphine oxide, bis(2,4,6-trimethylbenzoyl)-phenyl-phosphine oxide, and bis(2,6-dimethoxybenzoyl)-2,4,4-trimethylpentyl-phosphine oxide.

The content of the acylphosphine oxide compound in the ink is preferably 5 mass % or more from the viewpoint of improving the sensitivity. On the other hand, the content of the acylphosphine oxide compound is preferably 10 mass % or less from the viewpoint of improving storage stability.

The viscosity $\alpha$ of the ink at a temperature of 30° C. and a shear rate of 300 s$^{-1}$ is preferably 10 Pa·s or more and 40 Pa·s or less. The conditions of the temperature and the shear rate are assumed to be the temperature at the time of printing and the shear rate when the ink is transferred to the first substrate film. By setting the viscosity $\alpha$ to 10 Pa·s or more, the scumming resistance can be improved. The viscosity $\alpha$ is more preferably 15 Pa·s or more, and still more preferably 20 Pa·s or more. On the other hand, by setting the viscosity $\alpha$ to 40 Pa·s or less, the transferability of the ink to the first substrate film and the leveling property can be improved. The viscosity $\alpha$ is more preferably 35 Pa·s or less, and still more preferably 30 Pa·s or less.

Here, the viscosity $\alpha$ of the ink in the present invention can be measured using a dynamic viscoelasticity measuring device (rheometer) and a cone plate jig. The ink is placed between a cone plate and a lower plate, and the viscosity of the ink is measured from the torque applied to the cone plate when the cone plate rotates. The cone plate has a diameter of 40 mm and an inclination angle of 1°, and the gap between the cone plate and the lower plate is 81 μm. The dynamic viscoelasticity measuring device is heated to 30° C. in advance, the ink is placed on the lower plate, and the cone plate jig is set at the measurement position and then allowed to stand at 30° C. for 3 minutes. The viscosity of the ink is measured while the shear rate is continuously changed logarithmically in the range of the shear rate of 1 to 490 s$^{-1}$ to obtain an approximate expression of the shear rate and the viscosity. The viscosity $\alpha$ at a shear rate of 300 s$^{-1}$ is determined from the approximate expression.

The viscosity $\alpha$ of the ink can be adjusted to fall within the above-described range by, for example, using the above-described preferable resin, setting the contents of the resin and the compound having an ethylenically unsaturated double bond to the above-described preferable ranges, and using urethane (meth)acrylate as the compound having an ethylenically unsaturated double bond.

As the adhesive, an active energy ray-curable adhesive or a non-solvent isocyanate-curing adhesive is preferable. These adhesives are excellent in productivity because they do not generally contain an organic solvent to such an extent that the drying step is required and thus the drying step is unnecessary. Here, the term "non-solvent" means that the content of the organic solvent is 5 mass % or less. The content of the organic solvent is preferably 3 mass % or less.

The active energy ray-curable adhesive preferably contains a resin and a compound having an ethylenically unsaturated double bond. When the active energy ray-curable adhesive contains a resin, the adhesive can be applied to the uncured ink with good appearance. In addition, the flexibility of the cured film of the active energy ray-curable adhesive can be moderately improved. In addition, when the active energy ray-curable adhesive contains a compound having an ethylenically unsaturated double bond, the viscosity of the active energy ray-curable adhesive can be easily adjusted to a range suitable for processing, thus making it possible to improve the appearance of the laminated film. In addition, the adhesive can be cured by an active energy ray. Note that even a resin having an ethylenically unsaturated double bond is classified as the resin.

The resin preferably contains an isocyanate-curing resin. Here, the isocyanate-curing resin contains a polyol compound and a polyisocyanate compound. When the resin contains an isocyanate-curing resin, the flexibility of the cured film of the adhesive can be moderately improved. In addition, the adhesion strength as a laminate can be further improved when a laminate obtained by applying the adhesive to the first substrate and laminating the second substrate is aged.

The active energy ray-curable adhesive may further contain a leveling agent, an extender pigment, and the like as necessary.

Examples of the resin in the active energy ray-curable adhesive include those exemplified as the resin as a raw material of the ink. Among them, an acrylic resin, a styrene acrylic resin, a styrene maleic acid resin, and a polyurethane resin are preferably used from the viewpoint of adhesion to the ink, film strength after curing, and the like.

The resin in the active energy ray-curable adhesive preferably has an ethylenic double bond group, and inclusion of the resin having an ethylenic double bond group can further improve the strength of the cured film of the adhesive.

The weight average molecular weight of the resin in the active energy ray-curable adhesive is preferably 20,000 or more and 50,000 or less. Here, the weight average molecular weight of the resin refers to a value in terms of polystyrene calculated using gel permeation chromatography (GPC).

The content of the resin in the active energy ray-curable adhesive is preferably 10 mass % or more from the viewpoint of suppressing repelling of the adhesive at the time of application and further improving the flexibility of the cured film. On the other hand, the content of the resin in the active energy ray-curable adhesive is preferably 40 mass % or less from the viewpoint of suppressing back trapping by appropriately lowering the viscosity of the adhesive with respect to the ink and easily adjusting the viscosity ($\beta 1$) described later to a preferable range described later.

As the compound having an ethylenically unsaturated double bond, a monomer having an ethylenically unsaturated double bond is preferable. The compound having an ethylenically unsaturated double bond preferably have two or more ethylenically unsaturated double bonds in one molecule because it has high curability. On the other hand, the compound having an ethylenically unsaturated double bond preferably has six or less ethylenically unsaturated double bonds in one molecule from the viewpoint of improving the flexibility of the cured film of the adhesive. Among them, pentaerythritol tri(meth)acrylate, diglycerin tri(meth)acrylate, ditrimethylolpropane tri(meth)acrylate, ethoxylated pentaerythritol tetra(meth)acrylate, and ethoxylated trimethylolpropane tri(meth)acrylate are preferable.

The content of the compound having an ethylenically unsaturated double bond in the active energy ray-curable adhesive is preferably 60 mass % or more from the viewpoint of improving the strength of the cured film of the adhesive and easily adjusting the viscosity $\beta 1$ described later to a preferable range described later, and is preferably 90 mass % or less from the viewpoint of improving the flexibility of the cured film of the adhesive.

The active energy ray-curable adhesive is preferably a non-solvent adhesive, that is, the content of the organic solvent is preferably 5 mass % or less, and the productivity can be further improved by eliminating the need for the drying step. The content of the organic solvent is more preferably 3 mass % or less.

The viscosity $\beta 1$ of the active energy ray-curable adhesive at a temperature of 30° C. and a shear rate of 300 s$^{-1}$ is preferably 0.1 Pa·s or more and 20 Pa·s or less. The conditions of the temperature and the shear rate are assumed to be the temperature at the time of applying the adhesive and the shear rate when the adhesive is transferred onto the first substrate film and the ink having been transferred to the first substrate film. By setting the viscosity $\beta 1$ to 0.1 Pa·s or more, adhesiveness of the adhesive to the second substrate after lamination and before the curing step can be improved. On the other hand, by setting the viscosity $\beta 1$ to 20 Pa·s or less, the leveling property of the adhesive can be improved, and by setting the viscosity to be lower than that of the ink, back trapping can be suppressed. The viscosity $\beta 1$ is more preferably 10 Pa·s or less.

The ratio $\beta 1/\alpha$ of the viscosity $\beta 1$ of the active energy ray-curable adhesive to the viscosity $\alpha$ of the ink is preferably 0.01 or more and 1.0 or less. By setting the viscosity ratio $\beta 1/\alpha$ to 0.01 or more, the adhesive can be applied to the uncured ink with good appearance. On the other hand, by setting the viscosity ratio $\beta 1/\alpha$ to 1.0 or less, back trapping can be suppressed. By suppressing back trapping, the coating film of the adhesive can be uniformly formed, and adhesion as a laminate can also be improved.

In order to set the viscosity ratio $\beta 1/\alpha$ to the above range, the above-described resin and monomer having an ethylenically unsaturated double bond may be used for the ink and the adhesive. Further, the viscosity can be controlled by using a compound having all or any of the following characteristics as a monomer having an ethylenically unsaturated double bond that dissolves the resin used for the adhesive, and appropriately adjusting the proportion thereof.

(1) The compound has hydrophilicity by ethoxylation. Thereby, the compatibility of the resin can be improved, and the viscosity can be moderately increased.

(2) The compound has an alicyclic structure or a linear alkane structure. Thereby, the cohesive force of the adhesive resin solution can be suppressed, and the viscosity can be reduced.

(3) The compound has a double bond equivalent of 100 or more. Thereby, the hydrogen bonding force by the acrylic group can be suppressed, and the viscosity of the adhesive can be suppressed.

Here, the viscosity $\beta 1$ of the active energy ray-curable adhesive in the present invention can be measured by the same method as in the above-described ink.

The viscosity $\beta 1$ of the active energy ray-curable adhesive can be adjusted to fall within the above-described range by, for example, using the above-described preferable resin and the compound having an ethylenically unsaturated double bond, and setting the molecular weight of the resin and the contents of the resin and the compound having an ethylenically unsaturated double bond to the above-described preferable ranges.

The non-solvent isocyanate-curing adhesive preferably contains an isocyanate-curing resin and a compound having an ethylenically unsaturated double bond. When the non-solvent isocyanate-curing adhesive contains an isocyanate-curing resin, the adhesive can be applied to the uncured ink with good appearance. In addition, the flexibility of the cured film of the adhesive can be moderately improved. In addition, when the non-solvent isocyanate-curing adhesive contains a compound having an ethylenically unsaturated double bond, the viscosity of the non-solvent isocyanate-curing adhesive can be easily adjusted to a range suitable for processing, thus making it possible to improve the appearance of the laminated film. In addition, the adhesive can be cured by an active energy ray.

The isocyanate-curing resin contains at least a polyol compound and a polyisocyanate compound.

Examples of the polyol compound include polyether polyol, polyester polyol, and polycarbonate polyol. Two or more of these may be contained. Among them, polyether polyol and polyester polyol are preferable from the viewpoint of productivity. From the viewpoint of improving the leveling property of the coating film of the non-solvent isocyanate-curing adhesive, polyether polyol is more preferable, and from the viewpoint of improving the heat resistance in high temperature sterilization applications, polyester polyol is more preferable.

Examples of the polyisocyanate include compounds having an aromatic isocyanate, an aliphatic isocyanate, an alicyclic isocyanate or the like at the terminal thereof. Two or more of these may be used. Among them, from the viewpoint of safety, a compound having an aliphatic isocyanate or an alicyclic isocyanate at the terminal thereof is preferable, and from the viewpoint of adjusting the reaction rate and viscosity, a compound having an aliphatic diisocyanate, an alicyclic diisocyanate, or an aromatic alicyclic diisocyanate at the terminal thereof is more preferable.

Examples of the isocyanate-curing resin include a combination of a polyether polyol as a polyol compound and an aromatic polyisocyanate as a polyisocyanate, such as "TAKELAC" (registered trademark) A-244B/"TAKENATE" (registered trademark) A-244A, "TAKELAC" (registered trademark) A-246B/"TAKENATE" (registered trademark) A-246A, "TAKELAC" (registered trademark) A-248B/"TAKENATE" (registered trademark) A-246A manufactured by Mitsui Chemicals, Inc., and "EA-370A/EA-370B" manufactured by Toyo-Morton, Ltd.; and a combination of a polyester polyol as a polyol compound and an aliphatic, alicyclic, or aromatic alicyclic polyisocyanate as a polyisocyanate, such as "TAKELAC" (registered trademark) A-670B/"TAKENATE" (registered trademark) A-670A, "TAKELAC" (registered trademark) A-666/"TAKENATE" (registered trademark) A-65 manufactured by Mitsui Chemicals, Inc., and "TSN-4864A/TSN-4864B-3" manufactured by Toyo-Morton, Ltd.

Examples of the compound having an ethylenically unsaturated double bond include monomers, oligomers, and resins having an ethylenically unsaturated double bond. Urethane (meth)acrylate is more preferable from the viewpoint of compatibility with the isocyanate-curing resin. As the urethane (meth)acrylate, those exemplified as the urethane (meth)acrylate in the ink are preferable.

Examples of the resin having an ethylenically unsaturated double bond include an acrylic resin, a styrene acrylic resin, a styrene maleic acid resin, a rosin-modified maleic acid resin, a rosin-modified acrylic resin, and a polyurethane resin. Two or more of these may be contained. Among them, an acrylic resin, a styrene acrylic resin, and a styrene maleic acid resin are preferable from the viewpoint of ease of synthesis, adhesion to the ink, the strength of the coating film, and the like.

The monomer having an ethylenically unsaturated double bond preferably has two or more ethylenically unsaturated double bonds in one molecule because it has high curability. On the other hand, the number of ethylenically unsaturated double bonds in one molecule is preferably 6 or less, and more preferably 4 or less from the viewpoint of improving the flexibility of the cured film of the adhesive and improving the adhesiveness of the adhesive to the second substrate before the lamination step. As such a monomer, those exemplified as the monomer having an ethylenically unsaturated double bond in the active energy ray-curable adhesive are preferable.

The total content of the compound having an ethylenically unsaturated double bond in the non-solvent isocyanate-curing adhesive is preferably 1 mass % or more and 30 mass % or less. Here, the total content of the compound having an ethylenically unsaturated double bond refers to, when the adhesive contains only one of the monomer, oligomer, and resin having an ethylenically unsaturated double bond, the total content of the one of these, and when the adhesive contains two or more of these, the total contents of the two or more of these. By setting the total content thereof to 1 mass % or more, adhesion between the ink and the second substrate and the leveling property can be further improved. The total content thereof is more preferably 5 mass % or more. On the other hand, by setting the total content thereof to 30 mass % or less, adhesion between the ink and the second substrate after the isocyanate-curing component is cured by aging can be further improved.

The non-solvent isocyanate-curing adhesive may further contain a leveling agent, an extender pigment, and the like as necessary.

The viscosity $\beta 2$ of the non-solvent isocyanate-curing adhesive at a temperature of 30° C. and a shear rate of 300 $s^{-1}$ is preferably 1 Pa·s or more, and preferably 20 Pa·s or less. The viscosity $\beta 2'$ of the non-solvent isocyanate-curing adhesive at a temperature of 80° C. and a shear rate of 300 $s^{-1}$ is preferably 0.05 Pa·s or more, and preferably 5 Pa·s or less. The conditions of the temperature and the shear rate are assumed to be the temperature range of 30 to 80° C. at the time of applying the adhesive and the shear rate when the adhesive is transferred onto the first substrate film and the ink having been transferred to the first substrate film.

By setting the viscosity $\beta 2$ to 1 Pa·s or more, the adhesive can be applied to the uncured ink with good appearance, and the adhesiveness of the adhesive to the second substrate after the curing step and before the lamination step can be improved. The viscosity $\beta 2$ is more preferably 5 Pa·s or more. On the other hand, by setting the viscosity $\beta 2$ to 20 Pa·s or less, the leveling property can be improved. The viscosity $\beta 2$ is more preferably 15 Pa·s or less.

By setting the viscosity $\beta 2'$ to 0.05 Pa·s or more, the adhesive can be applied to the uncured ink with good appearance, and the adhesiveness of the adhesive to the second substrate after the curing step and before the lamination step can be improved. The viscosity $\beta 2'$ is more preferably 0.08 Pa·s or more. On the other hand, by setting the viscosity $\beta 2'$ to 5 Pa·s or less, the leveling property can be improved.

The ratio $\beta 2/\alpha$ of the viscosity $\beta 2$ of the non-solvent isocyanate-curing adhesive to the viscosity $\alpha$ of the ink is preferably 0.01 or more and 0.50 or less. By setting the viscosity ratio $\beta 2/\alpha$ to 0.01 or more, the adhesive can be applied to the uncured ink with good appearance. On the other hand, by setting the viscosity ratio $\beta 2/\alpha$ to 0.50 or less, the occurrence of orange peel or the like can be suppressed in the application of the adhesive.

In order to set the viscosity ratio $\beta 2/\alpha$ within the above range, the above-described ink and the adhesive containing the above-described resin and compound having an ethylenically unsaturated double bond may be used. Further, the viscosity can be controlled by using a compound having all or any of the following characteristics as a monomer having an ethylenically unsaturated double bond, and appropriately adjusting the proportion thereof.

(1) The compound has hydrophilicity by ethoxylation. Thereby, the compatibility of the resin can be improved, and the viscosity can be moderately increased.
(2) The compound has a double bond equivalent of 100 or more. Thereby, the hydrogen bonding force by the acrylic group can be suppressed, and the viscosity of the adhesive can be suppressed.

Here, the viscosities $β2$ and $β2'$ of the active energy ray-curable adhesive in the present invention can be measured by the same method as the viscosity of the ink described above.

The viscosities $β2$ and $β2'$ of the non-solvent isocyanate-curing adhesive can be adjusted to fall within the above-described ranges by, for example, using the above-described preferable isocyanate-curing adhesive and the compound having an ethylenically unsaturated double bond, and setting the content of the compound having an ethylenically unsaturated double bond to the above-described preferable range.

Next, each step of the first aspect and the second aspect will be described.

The first aspect of the method for producing a laminated film of the present invention includes a printing step, an adhesive application step, a lamination step, and a curing step in this order.

First, the printing step will be described. In the first aspect, the above-described ink is applied to the first substrate film. The printing method is preferably offset printing (lithographic printing) or flexographic printing that does not require the drying step and enables a plurality of times of laminations of uncured ink (wet-on-wet printing). Among them, offset printing is more preferable from the viewpoint of easily suppressing back trapping of the ink, and waterless offset printing is still more preferable from the viewpoint that contamination of the ink with a trace amount of moisture does not occur because the offset printing does not require a dampening solution, and radicals generated by irradiation with an active energy ray can be efficiently used for a curing reaction.

Next, the adhesive application step will be described. In the first aspect, an active energy ray-curable adhesive is applied in-line to a printed material obtained by applying the ink to the first substrate by the above-described printing step. As a method for applying the adhesive, offset printing or flexographic printing is preferable because the adhesive is applied onto the uncured ink. Flexographic printing is more preferable because it is easy to increase the film thickness of the adhesive and it is suitable for applying a material having a relatively low viscosity. The application temperature of the adhesive is preferably 20° C. to 40° C. in order to maintain favorable viscosity and application appearance at the time of application.

Examples of the printing press preferably used in the printing step and the adhesive application step include a center drum printing press "CI8" (manufactured by COMEXI). A coater having an existing active energy ray curing unit may be connected to the printing press.

Next, the lamination step will be described. In the first aspect, the second substrate is bonded and laminated, with a nip roll, to the laminate obtained by sequentially applying the ink and the adhesive to the first substrate. The nip pressure is preferably 0.1 MPa or more and 0.6 MPa or less. The nip roll temperature is preferably 40° C. or more and 80° C. or less.

Next, the curing step will be described. In the first aspect, the ink and the active energy ray-curable adhesive on the first substrate film can be quickly cured by irradiation with an active energy ray. The active energy ray used may be any ray as long as the ray has an excitation energy necessary for the curing reaction, and examples thereof preferably include electron beams and ultraviolet rays. When an electron beam is used, the ink can be cured without blending a photopolymerization initiator in the ink. Thus, the electron beam is particularly suitable for applications such as pharmaceutical packaging and food packaging in which migration of a low molecular weight compound to contents and odor peculiar to the initiator are avoided.

When the active energy ray is applied from both sides of the first substrate and the second substrate, the curability of the ink and/or the adhesive can be improved, which is preferable. In particular, as in the first aspect, in the case of performing irradiation with an electron beam in a state where the first substrate and the second substrate are laminated, when electron beams are applied from both surfaces of the laminate, electron beams required for only curing the ink and/or the adhesive can be applied even by irradiation with electron beams at a low acceleration voltage. It is therefore possible to suppress deterioration of the substrate due to the electron beam.

When the active energy ray is applied from only one of the first substrate film side and the second substrate side, it is preferable to apply the active energy ray from the side where the thickness is small or the side where the specific gravity of the substrate is small (when an aluminum foil is used for the second substrate, a side that is not an aluminum foil) from the viewpoint of more effectively proceeding the curing of the ink with the active energy ray. In addition, when a substrate having a relatively large change in physical properties due to the electron beam, such as a polypropylene film, is used, it is preferable to reduce the acceleration voltage contributing to the penetration depth of the electron beam and the irradiation dose contributing to the density of the electron beam within a range in which the ink and/or the adhesive is cured.

When the curing is conducted by using an electron beam, an electron beam device emitting an energy ray of 100 to 500 keV is preferably used.

The irradiation dose of the electron beam is preferably 10 kGy or more from the viewpoint of improving the curability of the ink and the active energy ray-curable adhesive. On the other hand, the irradiation dose of the electron beam is preferably 80 kGy or less from the viewpoint of suppressing deterioration and discoloration of the first substrate film and the second substrate.

The acceleration voltage contributing to the penetration depth of the electron beam is preferably 80 kV or more and 300 kV or less. When the acceleration voltage is 80 kV or more, the electron beam can be stably generated. When the acceleration voltage is 300 kV or less, more preferably 150 kV or less, a change in physical properties of the substrate film can be suppressed.

In the case of curing with ultraviolet rays, for example, an ultraviolet lamp such as a high-pressure mercury lamp, a xenon lamp, a metal halide lamp, or a light emitting diode (LED) is preferably used. A light emitting diode that emits a bright line having a wavelength of 350 to 420 nm is preferable from the viewpoint of power saving and cost reduction.

In the curing step, the elastic modulus of the coating film of the active energy ray-curable adhesive after curing is preferably 5 MPa or more, and more preferably 10 MPa or more from the viewpoint of improving the flexibility and strength of the coating film. On the other hand, the elastic modulus of the coating film of the active energy ray-curable adhesive after curing is preferably 600 MPa or less, and more preferably 500 MPa or less from the viewpoint of suppressing generation of cracks and the like. The elastic modulus of the coating film is measured by a nanoindenter.

Next, the second aspect of the present invention will be described. The second aspect of the method for producing a laminated film of the present invention includes a printing step, an adhesive application step, a curing step, and a lamination step in this order.

The printing step and the lamination step are the same as those in the first aspect.

In the adhesive application step, the non-solvent isocyanate-curing adhesive is applied in-line to the printed material obtained by applying the ink to the first substrate by the printing step without passing through the winding step. Examples of the method for applying the adhesive include the methods exemplified in the first aspect, and flexographic printing is preferable. The application temperature of the adhesive is preferably 20° C. to 80° C. in order to maintain favorable viscosity and application appearance at the time of application.

Examples of the printing press preferably used in the printing step and the adhesive application step include those exemplified in the first aspect.

Next, the curing step will be described. As in the first aspect, in the curing step, the ink on the first substrate film can be quickly cured by irradiation with an active energy ray. In addition, the initial adhesion strength can be improved by semi-curing the non-solvent isocyanate-curing adhesive to increase the apparent molecular weight thereof. In the second aspect, since the second substrate is not irradiated with an electron beam, a change in physical properties of the second substrate due to the electron beam can be prevented.

The active energy ray used may be any ray as long as the ray has an excitation energy necessary for the curing reaction, and examples thereof preferably include electron beams and ultraviolet rays.

The initial peel strength of the laminate obtained by the method for producing a laminated film of the present invention is preferably 0.5 N or more, more preferably 0.8 N or more, more preferably 1.0 N or more, still more preferably 1.5 N or more from the viewpoint of preventing appearance defects in post-processing.

In particular, the peel strength after aging of the laminate obtained in the second aspect is preferably 1.5 N or more, more preferably 2.0 N or more, and still more preferably 3.0 N or more from the viewpoint of maintaining good strength as a packaging material. Here, the peeling strength of the laminate is measured in the section (8) of the evaluation method in Examples described later.

EXAMPLES

Evaluation methods in the Examples and Comparative Examples are described below.
(1) Weight Average Molecular Weight of Resin The weight average molecular weight of the resin used in Examples and Comparative Examples is measured by gel permeation chromatography (GPC) using tetrahydrofuran as a mobile phase.

Each resin was added to tetrahydrofuran so as to have a resin concentration of 0.25 mass %, and dissolved by stirring at a rotation speed of 100 rpm for 5 minutes using a shaker MIX-ROTAR VMR-5 (manufactured by AS ONE Corporation). The obtained solution was filtered with a 0.2 µm filter Z227536-100EA (manufactured by SIGMA), and the filtrate was used as a measurement sample. Detection was performed using an RI detector built in a gel permeation chromatography apparatus HLC-8220 (manufactured by Tosoh Corporation). As a column, TSKgel SuperHM-H (manufactured by Tosoh Corporation), TSKgel SuperHM-H (manufactured by Tosoh Corporation), and TSKgel SuperH 2000 (manufactured by Tosoh Corporation) were connected in this order, the injection amount was 10 µL, the analysis time was 30 minutes, the flow rate was 0.4 mL/min, and the column temperature was 40° C. The weight average molecular weight of the resin was calculated from the calibration curve created using the polystyrene standard substance.
(2) Acid Value of Resin The acid value of the resin was determined according to the neutralization titration in Section 3.1 of the test method of JIS K 0070: 1992.
(3) Iodine Value of Resin The iodine value of the resin was determined by the method described in Section 6.0 of the test method of JIS K 0070: 1992.
(4) Hydroxyl Value of Monomer The hydroxyl value of the monomer was measured according to the neutralization titration of Section 7.1 of the test method of JIS K 0070: 1992.
(5) Ink Viscosity α

The viscosity of the ink used in Examples and Comparative Examples was measured by the following procedure using a dynamic viscoelasticity measuring device Pyhsia MCR301 (manufactured by Anton Paar GmbH) using a cone plate jig having a cone plate with a diameter of 40 mm and an inclination angle of 1.00° and a lower plate, and having a gap between the cone plate and the lower plate of 81 µm. First, the dynamic viscoelasticity measuring device was heated to 30° C. in advance, 0.7 mL of ink was placed between the heated cone plate and lower plate, and the cone plate jig is set at the measurement position and then allowed to stand at 30° C. for 3 minutes. Next, the viscosity at a shear rate of 300 s$^{-1}$ was determined from an approximate curve of the shear rate and the viscosity obtained by measuring the viscosity of the ink while the shear rate is continuously changed logarithmically in the range of the shear rate of 1 to 490 s$^{-1}$ at a temperature of 30° C.
(6) Viscosity β1, β2, β2' of Adhesive The viscosities β1 and β2 of the active energy-curable adhesive and the non-solvent isocyanate-curing adhesive used in Examples and Comparative Examples were measured in the same manner as in the ink viscosity α described in the above section (5).

The viscosity β2' of the non-solvent isocyanate-curing adhesive used in Examples and Comparative Examples was measured in the same manner as in the viscosities β1 and β2 except that the preheating temperature and the measurement temperature of the device were set to 80° C.
(7) Curability of Ink A laminated film was produced in the same manner as in Examples and Comparative Examples except that a PET film "EMBLET" (registered trademark) PET 12 µm (manufactured by UNITIKA Ltd.) was used instead of the film A as the first substrate. Since the ink in the obtained laminated film was subjected to a curing step under the same conditions as those in Examples and Comparative Examples, the curability of the ink in the laminated film obtained in Examples and Comparative Examples was evaluated from the ink in the laminated film obtained here.

The obtained laminated film was allowed to stand at 40° C. for 72 hours, that is, aged. Then, the PET film as the first substrate was peeled off, and the exposed surface of the ink cured product was rubbed with a cloth (No. 6 canvas)

immersed in methyl ethyl ketone. The presence or absence of coloring of the cloth with the ink was visually observed. The curability of the ink was evaluated according to the following criteria from the number of reciprocations until the cloth was colored.

A: 50 or more reciprocations
B: 15 to 49 reciprocations
C: 14 reciprocations or less.

(8) Adhesion to Second Substrate and Productivity of Laminated Film

A section having a width of 15 mm and a length of 50 mm was cut out from the laminated film obtained in Examples and Comparative Examples. Under an environment of an air temperature of 25° C. and a humidity of 50% RH, the first substrate film and the second substrate were respectively held with upper and lower chucks of a TENSILON universal material testing instrument RTG-1210 (manufactured by A & D Company, Limited), and a tensile test was performed at a test speed of 300 mm/min to measure a load value at a first maximum point. Measurement was performed three times, and the average value of the measurements was taken as the initial peel strength. Further, the section after the tensile test were visually observed, and the peeling mode was specified.

The laminated film obtained in Examples and Comparative Examples was allowed to stand at a temperature of 40° C. for 72 hours, that is, aged. Then, the peel strength after aging was measured by the same method, and the adhesion was evaluated. A case where the peel strength after aging was 2.0 N or more, or a case where the fracture mode was film breakage was evaluated as having good adhesion.

The productivity was also evaluated from the initial peel strength and the peel strength after aging according to the following criteria.

S: The initial peel strength and the peel strength after aging are both 1.5 N or more, and the difference between both peel strengths is 1.0 N or less
A: The initial peel strength is 0.8 or more and less than 1.5 N, and the peel strength after aging is 1.5 N or more
B: The initial peel strength is 0.5 N or more and less than 0.8 N
C: The initial peel strength is less than 0.5 N.

(9) Print Appearance

In Examples and Comparative Examples, the leveling property was visually observed from gloss and the presence or absence of ink voids in the solid part immediately after the ink was transferred to the first substrate film A, and the print appearance was evaluated according to the following criteria.

S: The leveling property is particularly good
A: The leveling property is good
B: The leveling property is slightly poor.

(10) Laminate Appearance

The laminated film obtained in Examples and Comparative Examples was visually observed, and the presence or absence of interlayer delamination, bubbles, and the like was observed.

In Examples and Comparative Examples, the reflection density of the solid part after the printing step and before the adhesive application step and the reflection density of the solid part of the obtained laminated film were measured using a reflection densitometer ("SpectroEye" manufactured by GretagMacbeth LLC) in the measurement mode of status E, and the presence or absence of back trapping was evaluated from the difference between the reflection densities. In the measurement of the reflection density, a coated paper was used as a standard for the reflection density of 0.

From these results, the laminate appearance was evaluated according to the following criteria.

S: The color density change is less than 0.1, and interlayer delamination, bubbles, and the like are not observed
A: The color density change is 0.1 or more and less than 0.3, and interlayer delamination, bubbles, and the like are hardly observed
B: The color density change is 0.3 or more, or interlayer delamination, bubbles, or the like is observed.

Materials used in Examples and Comparative Examples are shown below.

<Substrate Film>

First substrate film A: a polyester film having a urethane bond-containing easily adhesive layer and having a thickness of 12 μm Second substrate film B: a cast polypropylene film having a thickness of 50 μm, "TORAYFAN" (registered trademark) ZK207 (trade name) (manufactured by Toray Advanced Film Co., Ltd.).

<Raw Materials of Ink, Active Energy Ray-Curable Adhesive, and Non-Solvent Isocyanate-Curing Adhesive>

(Resin)
Resin 1:

A resin having an ethylenically unsaturated double bond and a hydrophilic group (hydroxyl group and carboxyl group) was obtained by an addition reaction in which 0.55 equivalents of glycidyl methacrylate were combined with carboxyl groups of a copolymer of 25 mass % of methyl methacrylate, 25 mass % of styrene, and 50 mass % of methacrylic acid, and the obtained resin was used as a resin 1. The obtained resin 1 had a weight average molecular weight of 34,000, an acid value of 105 mgKOH/g, and an iodine value of 2.0 mol/kg.

Resin 2:

A resin which was a copolymer of 25 mass % of methyl methacrylate, 25 mass % of styrene, and 50 mass % of methacrylic acid was used as a resin 2. The resin 2 has neither a hydrophilic group nor an ethylenically unsaturated double bond. The weight average molecular weight of the resin 2 was 30,000.

(Urethane (Meth)Acrylate)
Urethane Acrylate 1:

An oligomer having two ethylenically unsaturated double bonds at terminals thereof was used as a urethane acrylate 1, and the oligomer was obtained from alicyclic diisocyanate (IPDI), polyether polyol (polytetramethylene ether glycol), and 2-hydroxyethyl acrylate. The weight average molecular weight of the urethane acrylate 1 was 3,300.

Urethane Acrylate 2:

An oligomer having two ethylenically unsaturated double bonds at terminals thereof was used as a urethane acrylate 2, and the oligomer was obtained from alicyclic diisocyanate (IPDI), polyether polyol (polytetramethylene ether glycol), and 2-hydroxyethyl acrylate. The weight average molecular weight of the urethane acrylate 2 was 13,000.

(Monomer Having Ethylenically Unsaturated Double Bond)
Monomer 1:

A mixture of pentaerythritol triacrylate and pentaerythritol tetraacrylate "Miramer" (registered trademark) M340 (manufactured by MIWON) was used. The hydroxyl value of the monomer 1 was 115 mgKOH/g.

Monomer 2:

Tricyclodecane dimethanol diacrylate "Miramer" (registered trademark) M262 (manufactured by MIWON) was used. The hydroxyl value of the monomer 2 was 0 mgKOH/g.

(Other Additives)

Polymerization inhibitor: p-methoxyphenol (manufactured by Wako Pure Chemical Industries, Ltd.)

Pigment: Seika Cyanine Blue 4920 (manufactured by Dainichiseika Color & Chemicals Mfg. Co., Ltd.)

Extender pigment: "MICRO ACE" (registered trademark) P-8 (manufactured by Nippon Talc Co., Ltd.).

<Preparation of Ink>

The above ink raw materials were weighed in the following composition, and passed through a three roll mill "EXAKT" (registered trademark) M-80S (manufactured by Exakt Technologies.) five times with the setting "Gap 1" in the apparatus to obtain a printing ink.

(Ink A)

Resin 1: 11.7 mass %, monomer 1: 42.1 mass %, monomer 2: 25.1 mass %, polymerization inhibitor: 0.1 mass %, pigment: 18.0 mass %, extender pigment: 3.0 mass %.

(Ink B)

Resin 1: 10.5 mass %, urethane acrylate 1: 10.0 mass %, monomer 1: 40.4 mass %, monomer 2: 20.0 mass %, polymerization inhibitor: 0.1 mass %, pigment: 18.0 mass %, extender pigment: 1.0 mass %.

(Ink C)

Resin 1: 9.7 mass %, monomer 1: 43.1 mass %, monomer 2: 26.1 mass %, polymerization inhibitor: 0.1 mass %, pigment: 18.0 mass %, extender pigment: 3.0 mass %.

(Ink D)

Resin 2: 18.0 mass %, monomer 1: 30.5 mass %, monomer 2: 30.4 mass %, polymerization inhibitor: 0.1 mass %, pigment: 18.0 mass %, extender pigment: 3.0 mass %.

Example 1

The resin 1, the monomer 1, and the monomer 2 were blended in the compositions shown in Table 1, and the mixture was passed through a three roll mill "EXAKT" (registered trademark) M-80S (manufactured by Exakt Technologies.) five times with the setting "Gap 1" in the apparatus to obtain an active energy ray-curable adhesive.

Using an offset printing unit of a center drum printing press "CI8" (manufactured by COMEXI), the ink A was transferred onto the first substrate film A so that the application amount was 1.0 g/m² to form an ink coating film (printing step). Using a flexographic printing unit of the center drum printing press "CI8" (manufactured by COMEXI), an adhesive A was applied onto the ink coating film so that the application amount was 2.0 g/m² (adhesive application step), and the second substrate film B was laminated thereon using a nip roll (lamination step). Using an electron beam irradiation unit, the obtained laminate was irradiated with an electron beam from the first substrate film side under the conditions of an acceleration voltage of 110 kV and an irradiation dose of 30 kGy (curing step) to obtain a laminated film with the first substrate film A, the ink A, the active energy ray-curable adhesive, and the second substrate film B laminated in this order. The evaluation results of the obtained laminated film are shown in Table 1.

Examples 2 to 5

Laminated films were produced in the same manner as in Example 1 except that the composition and ink of the active energy ray-curable adhesive were changed as shown in Table 1. The evaluation results of the obtained laminated films are shown in Table 1.

Example 6

A laminated film was produced in the same manner as in Example 1 except that the composition and ink of the active energy ray-curable adhesive were changed as shown in Table 1, and an electron beam was applied from both sides of the first substrate film side and the second substrate film side using an electron beam irradiation unit under the conditions of an acceleration voltage of 110 kV and an irradiation dose of 30 kGy. The evaluation results of the obtained laminated films are shown in Table 1.

Comparative Example 1

The ink A was transferred to the first substrate film A by the same method as in Example 1 (printing step), and electron beam irradiation was performed under the same conditions as in Example 1 (curing step) to obtain a laminate of the first substrate film A/cured film of the ink A.

A mixture of a solvent-containing adhesive "TAKELAC" (registered trademark) A-969V/"TAKENATE" (registered trademark) A-5 manufactured by Mitsui Chemicals, Inc. at a mass ratio of 3/1 was applied onto the cured film of the ink A using a bar coater so that the application amount was 2.0 g/m², and dried at 80° C. for 1 minute (adhesive application step).

Thereafter, the second substrate film B was laminated using a hand roller (lamination step) to obtain a laminated film with the first substrate film A, the ink A, the adhesive, and the second substrate film B laminated in this order. The evaluation results of the obtained laminated films are shown in Table 1.

TABLE 1

|  |  | Example 1 | Example 2 | Example 3 | Example 4 |
|---|---|---|---|---|---|
| Ink |  | A | B | A | D |
| Adhesive for dry lamination |  | — | — | — | — |
| Composition of active energy ray-curable adhesive [mass %] | Resin 1 | 30 | 20 | — | 50 |
|  | Resin 2 | — | — | 50 | — |
|  | Monomer 1 | 35 | 40 | 25 | 25 |
|  | Monomer 2 | 35 | 40 | 25 | 25 |
| $\beta 1/\alpha$ |  | 0.32 | 0.11 | 0.72 | 0.53 |
| Ink viscosity $\alpha$ [Pa · s] |  | 25 | 35 | 25 | 45 |
| Adhesive viscosity $\beta 1$ [Pa · s] |  | 8 | 4 | 18 | 24 |
| Print appearance |  | S | A | S | B |
| Laminate appearance |  | S | S | A | S |
| Ink curability |  | S | S | S | S |
| Initial peel strength [N] (Fracture mode) |  | 2.4 (Film breakage) | 2.6 (Film breakage) | 1.8 (Film breakage) | 1.7 (Film breakage) |
| Peel strength after aging [N] |  | 2.5 (Film | 2.9 (Film | 2.0 (Film | 1.8 (Film |

TABLE 1-continued

| (Fracture mode) | breakage) | breakage) | breakage) | breakage) |
|---|---|---|---|---|
| Productivity | S | S | S | S |

| | | Example 5 | Example 6 | Comparative Example 1 |
|---|---|---|---|---|
| Ink | | C | A | A |
| Adhesive for dry lamination | | — | — | 100 |
| Composition of active energy ray-curable adhesive [mass %] | Resin 1 | 50 | 30 | — |
| | Resin 2 | — | — | — |
| | Monomer 1 | 25 | 35 | — |
| | Monomer 2 | 25 | 35 | — |
| $\beta 1/\alpha$ | | 3.00 | 0.32 | <0.01 |
| Ink viscosity $\alpha$ [ Pa · s] | | 8 | 25 | 25 |
| Adhesive viscosity $\beta 1$ [Pa · s] | | 24 | 8 | 0.02 |
| Print appearance | | S | S | S |
| Laminate appearance | | B | S | A |
| Ink curability | | S | S | B |
| Initial peel strength [N] | | 1.5 (Film | 3.0 (Film | 0.6 (Adhesive/ |
| (Fracture mode) | | breakage) | breakage) | second substrate) |
| Peel strength after aging [N] | | 1.6 (Film | 3.0 (Film | 2.6 (Film |
| (Fracture mode) | | breakage) | breakage) | breakage) |
| Productivity | | S | S | B |

Example 7

Using an offset printing unit of a center drum printing press "CI8" (manufactured by COMEXI), the ink A was transferred onto the substrate film A so that the application amount was 1.0 g/m² to form an ink coating film (printing step).

Using a flexographic printing unit of the center drum printing press "CI8" (manufactured by COMEXI), a mixture of an isocyanate-curing adhesive "TAKELAC" (registered trademark) A-670B/"TAKENATE" (registered trademark) A-670A at a mass ratio of 5/10 was applied onto the ink coating film so that the application amount was 2.0 g/m² (adhesive application step), and an electron beam was applied from the side of the surface to which the adhesive had been applied under the same conditions as in Example 1 (curing step).

Subsequently, the second substrate film B was laminated using a nip roll to obtain a laminated film. The evaluation results of the obtained laminate are shown in Table 2.

Example 8

"TAKELAC" (registered trademark) A-670 B/"TAKENATE" (registered trademark) A-670A" (mass ratio: 5/10) as isocyanate-curing resins, and the resin 1 were blended in the compositions shown in Table 2 to obtain a non-solvent isocyanate-curing adhesive. Specifically, first, 30 parts by mass of "TAKELAC" (registered trademark) A-670B and 10 parts by mass of the resin 1 were mixed by passing these materials through a three roll mill "EXAKT" (registered trademark) M-80S (manufactured by Exakt Technologies.) five times with the setting "Gap 1" in the apparatus. Then, 60 parts by mass of "TAKENATE" (registered trademark) A-670A was added to 40 parts by mass of the obtained mixture, and the resulting mixture was manually shaken and stirred to prepare a non-solvent isocyanate-curing adhesive.

A laminated film was obtained in the same manner as in Example 7 except that the non-solvent isocyanate-curing adhesive was used. The evaluation results of the obtained laminated film are shown in Table 2.

Examples 9 and 10

"TAKELAC" (registered trademark) A-670B/"TAKENATE" (registered trademark) A-670A (mass ratio: 5/10) as isocyanate-curing resins, and urethane acrylate 1 or 2 were blended in the compositions shown in Table 2 to obtain each non-solvent isocyanate-curing adhesive. Specifically, 10 parts by mass of urethane acrylate 1 or 2 was added to 90 parts by mass of a mixture of "TAKELAC" (registered trademark) A-670B/"TAKENATE" (registered trademark) A-670A at a mass ratio of 5/10, and the mixture was manually shaken and stirred to obtain each non-solvent isocyanate-curing adhesive.

Laminated films were obtained in the same manner as in Example 7 except that the non-solvent isocyanate-curing adhesive was used. The evaluation results of the obtained laminated films are shown in Table 2.

Comparative Example 2

The ink A was transferred to the first substrate film A by the same method as in Example 1 (printing step), and electron beam irradiation was performed under the same conditions as in Example 1 (curing step) to obtain a laminate of the first substrate film A/cured film of the ink A.

A mixture of a non-solvent isocyanate-curing adhesive "TAKELAC" (registered trademark) A-244B/"TAKENATE" (registered trademark) A-244A manufactured by Mitsui Chemicals, Inc. at a mass ratio of 5/10 was applied onto the cured film of the ink A using a bar coater so that the application amount was 2.0 g/m² (adhesive application step).

Thereafter, the second substrate film B was laminated using a hand roller (lamination step) to obtain a laminated film with the first substrate film A, the ink A, the adhesive, and the second substrate film B laminated in this order. The evaluation results of the obtained laminated films are shown in Table 2.

TABLE 2

|  |  | Example 7 | Example 8 | Example 9 | Example 10 | Comparative Example 2 |
|---|---|---|---|---|---|---|
| Ink |  | A | A | A | A | A |
| Composition of non-solvent isocyanate curable adhesive [mass %] | Isocyanate curable resin | 100 | 90 | 90 | 90 | 100 |
|  | Resin 1 | — | 10 | — | — | — |
|  | Urethane acrylate 1 | — | — | 10 | — | — |
|  | Urethane acrylate 2 | — | — | — | 10 | — |
|  | Monomer 1 | — | — | — | — | — |
| $\beta2/\alpha$ |  | 0.32 | 0.48 | 0.36 | 0.44 | 0.32 |
| Ink viscosity $\alpha$ [Pa·s] |  | 25 | 25 | 25 | 25 | 25 |
| Adhesive viscosity $\beta2$ [Pa·s] |  | 8.0 | 12.0 | 9.0 | 11.1 | 8.0 |
| Adhesive viscosity $\beta2'$ [Pa·s] |  | 0.5 | 4.5 | 2.2 | 3.1 | 0.5 |
| Laminate appearance |  | A | S | S | S | A |
| Ink curability |  | A | S | S | S | B |
| Initial peel strength [N] (Fracture mode) |  | 0.5 (Adhesive/ second substrate) | 0.8 (Adhesive/ second substrate) | 1.5 (Adhesive/ second substrate) | 1.0 (Adhesive/ second substrate) | 0.3 (Adhesive/ second substrate) |
| Peel strength after aging [N] (Fracture mode) |  | 3.0 (Film breakage) | 3.1 (Film breakage) | 3.0 (Film breakage) | 2.8 (Film breakage) | 1.6 (First substrate/ink) |
| Productivity |  | B | A | S | A | C |

DESCRIPTION OF REFERENCE SIGNS

1: First substrate film
2: Offset printing unit
3: Flexographic printing unit
4: Nip roll
5: Second substrate
6: Electron beam irradiation device

The invention claimed is:

1. A method for producing a laminated film, the method comprising:
a printing step of applying an active energy ray-curable printing ink to a first substrate film formed of at least a plastic film;
an adhesive application step of applying an adhesive; and
a lamination step of laminating a second substrate;
the steps being performed in this order in-line;
wherein the method further comprises a curing step of irradiating the active energy ray-curable printing ink with an active energy ray to cure the active energy ray-curable printing ink after at least the adhesive application step;
wherein the adhesive in the adhesive application step is a non-solvent isocyanate-curing adhesive; and
wherein the method includes the curing step before the lamination step.

2. A method for producing a laminated film, the method comprising:
a printing step of applying an active energy ray-curable printing ink to a first substrate film formed of at least a plastic film;
an adhesive application step of applying an adhesive; and
a lamination step of laminating a second substrate;
the steps being performed in this order in-line;
wherein the method further comprises a curing step of irradiating the active energy ray-curable printing ink with an active energy ray to cure the active energy ray-curable printing ink after at least the adhesive application step;
wherein the adhesive is an active energy ray-curable adhesive;
wherein the method includes the curing step after the lamination step;
wherein the active energy ray-curable printing ink and the active energy ray-curable adhesive are cured in the curing step; and
wherein a viscosity $\beta1$ of the active energy ray-curable adhesive at a temperature of 30° C. and a shear rate of 300 s$^{-1}$ is 0.1 Pa·s or more and 20 Pa·s or less.

3. A method for producing a laminated film, the method comprising:
a printing step of applying an active energy ray-curable printing ink to a first substrate film formed of at least a plastic film;
an adhesive application step of applying an adhesive; and
a lamination step of laminating a second substrate;
the steps being performed in this order in-line;
wherein the method further comprises a curing step of irradiating the active energy ray-curable printing ink with an active energy ray to cure the active energy ray-curable printing ink after at least the adhesive application step;
wherein the adhesive is an active energy ray-curable adhesive;
wherein the method includes the curing step after the lamination step;
wherein the active energy ray-curable printing ink and the active energy ray-curable adhesive are cured in the curing step; and
wherein a viscosity $\alpha$ of the active energy ray-curable printing ink at a temperature of 30° C. and a shear rate of 300 s$^{-1}$ is 10 Pa·s or more and 40 Pa·s or less.

4. The method according to claim 1,
wherein a ratio $\beta2/\alpha$ of a viscosity $\beta2$ of the non-solvent isocyanate-curing adhesive at 30° C. and a shear rate of 300 s$^{-1}$ to a viscosity $\alpha$ of the active energy ray-curable printing ink at 30° C. and a shear rate of 300 s$^1$ is 0.01 or more and 0.50 or less.

5. The method according to claim 4, wherein the viscosity $\beta2$ of the non-solvent isocyanate-curing adhesive at a temperature of 30° C. and a shear rate of 300 s$^{-1}$ is 1 Pa·s or more and 20 Pa·s or less, and a viscosity $\beta2'$ at a temperature of 80° C. and a shear rate of 300 s$^{-1}$ is 0.05 Pa·s or more and 5 Pa·s or less.

6. The method according to claim 1, wherein a viscosity $\alpha$ of the active energy ray-curable printing ink at a temperature of 30° C. and a shear rate of 300 s$^{-1}$ is 10 Pa·s or more and 40 Pa·s or less.

7. The method according to claim 1, wherein
the non-solvent isocyanate-curing adhesive contains an isocyanate-curing resin and a compound having an ethylenically unsaturated double bond; and
a total content of the compound having an ethylenically unsaturated double bond is 1 mass % or more and 30 mass % or less.

8. The method according to claim 7, wherein the compound having an ethylenically unsaturated double bond contains a urethane (meth)acrylate.

9. The method according to claim 8, wherein a weight average molecular weight Mw of the urethane (meth)acrylate is 500 to 10,000.

10. The method according to claim 2, wherein a ratio $\beta 1/\alpha$ of the viscosity $\beta 1$ of the active energy ray-curable adhesive at a temperature of 30° C. and a shear rate of 300 $s^{-1}$ to a viscosity $\alpha$ of the active energy ray-curable printing ink at a temperature of 30° C. and a shear rate of 300 $s^{-1}$ is 0.01 or more and 1.0 or less.

11. The method according to claim 2, wherein a viscosity $\alpha$ of the active energy ray-curable printing ink at a temperature of 30° C. and a shear rate of 300 $s^{-1}$ is 10 Pa·s or more and 40 Pa·s or less.

12. The method according to claim 2, wherein the active energy ray-curable adhesive contains at least a resin and a compound having an ethylenically unsaturated double bond.

13. The method according to claim 12, wherein the compound having an ethylenically unsaturated double bond contains a urethane (meth)acrylate.

14. The method according to claim 13, wherein a weight average molecular weight Mw of the urethane (meth)acrylate is 500 to 10,000.

15. The method according to claim 2, wherein the active energy ray in the curing step is an electron beam.

16. The method according to claim 3, wherein a ratio $\beta 1/\alpha$ of a viscosity $\beta 1$ of the active energy ray-curable adhesive at a temperature of 30° C. and a shear rate of 300 $s^{-1}$ to the viscosity $\alpha$ of the active energy ray-curable printing ink at a temperature of 30° C. and a shear rate of 300 $s^{-1}$ is 0.01 or more and 1.0 or less.

17. The method according to claim 16, wherein the viscosity $\beta 1$ of the active energy ray-curable adhesive at a temperature of 30° C. and a shear rate of 300 $s^{-1}$ is 0.1 Pa·s or more and 20 Pa·s or less.

18. The method according to claim 3, wherein the active energy ray-curable adhesive contains at least a resin and a compound having an ethylenically unsaturated double bond.

19. The method according to claim 3, wherein the active energy ray-curable printing ink contains a resin and a compound having an ethylenically unsaturated double bond.

20. The method according to claim 19, wherein the compound having an ethylenically unsaturated double bond contains a urethane (meth)acrylate.

21. The method according to claim 20, wherein a weight average molecular weight Mw of the urethane (meth)acrylate is 500 to 10,000.

* * * * *